US012567737B2

(12) United States Patent
Huber

(10) Patent No.: US 12,567,737 B2
(45) Date of Patent: Mar. 3, 2026

(54) PROGRAMMABLE DC POWER BUS OVER VOLTAGE PROTECTION

(71) Applicant: Rolls-Royce Corporation, Indianapolis, IN (US)

(72) Inventor: Brian Joseph Huber, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 170 days.

(21) Appl. No.: 18/358,540

(22) Filed: Jul. 25, 2023

(65) Prior Publication Data

US 2025/0038523 A1     Jan. 30, 2025

(51) Int. Cl.
H02H 9/00      (2006.01)
B64D 27/24     (2006.01)
H02H 9/04      (2006.01)

(52) U.S. Cl.
CPC ............. H02H 9/042 (2013.01); B64D 27/24 (2013.01); B64D 2221/00 (2013.01)

(58) Field of Classification Search
CPC ............................... H02H 9/042; B64D 27/24
USPC .......................................................... 361/56
See application file for complete search history.

(56) References Cited

U.S. PATENT DOCUMENTS

| 8,335,067 | B2 | 12/2012 | Divan |
| 9,837,834 | B2 | 12/2017 | Sugiyama et al. |
| 9,960,637 | B2 | 5/2018 | Sanders et al. |
| 10,283,968 | B2 | 5/2019 | ElBsat et al. |
| 10,818,983 | B2 | 10/2020 | Yonemoto et al. |
| 11,209,475 | B2 * | 12/2021 | Barnet ................... H02H 9/044 |
| 11,437,665 | B2 | 9/2022 | Soto et al. |
| 11,560,237 | B2 | 1/2023 | Zoppitelli et al. |
| 2018/0331534 | A1 | 11/2018 | Nojima |
| 2018/0375323 | A1 | 12/2018 | Eberts et al. |
| 2019/0061974 | A1 * | 2/2019 | Eberts ...................... H02H 1/04 |
| 2022/0017064 | A1 | 1/2022 | Dougherty |
| 2022/0169398 | A1 | 6/2022 | Ouellet et al. |

(Continued)

FOREIGN PATENT DOCUMENTS

| CH | 452666 A | 3/1968 |
| CN | 203056572 A | 7/2013 |
| EP | 2523296 A1 | 11/2012 |

(Continued)

OTHER PUBLICATIONS

Renesas Electronics Corporation, "RS-485 Transient Protection in Industrial DC-Supply Buses", Nov. 2017, 7 pp.

(Continued)

*Primary Examiner* — Thienvu V Tran
*Assistant Examiner* — Lucy M Thomas
(74) *Attorney, Agent, or Firm* — Shumaker & Sieffert, P.A.

(57) ABSTRACT

An example system includes a plurality of transient voltage suppressors (TVSs) that are connected in series across an electrical bus of an aircraft, the electrical bus having a high side and a low side; a plurality of switches, each switch of the plurality of switches configured to selectively shunt a corresponding TVS of the plurality of TVSs to the low side of the electrical bus; and a controller configured to: determine a desired voltage suppression level; and control operation of the plurality of switches such that the plurality of TVSs provides the desired voltage suppression level.

12 Claims, 4 Drawing Sheets

(56) References Cited

U.S. PATENT DOCUMENTS

2022/0363402 A1    11/2022  Schenk et al.

FOREIGN PATENT DOCUMENTS

| | | | |
|---|---|---|---|
| EP | 2549613 | A1 | 1/2013 |
| EP | 3203251 | A2 | 8/2017 |
| EP | 3512061 | A1 | 7/2019 |
| EP | 3670339 | A1 | 6/2020 |
| EP | 3915880 | A1 | 12/2021 |
| EP | 3089303 | B1 | 7/2022 |
| WO | 2018191769 | A1 | 10/2018 |

OTHER PUBLICATIONS

Extended Search Report from counterpart European Application No. 23204603.7 dated Apr. 24, 2024, 8 pp.
U.S. Appl. No. 18/462,210, filed Sep. 6, 2023, naming inventors Long et al.
Response to Extended Search Report dated Apr. 24, 2025, from counterpart European Application No. 23204603.7 filed Jul. 3, 2025, 32 pp.

* cited by examiner

DETERMINE DESIRED VOLTAGE SUPPRESSION LEVEL FOR AN ELECTRICAL BUS OF AN AIRCRAFT — 402

CONTROL A PLURALITY OF TRANSIENT VOLTAGE SUPPRESSORS (TVSS) CONNECTED IN SERIES ACROSS THE ELECTRICAL BUS TO PROVIDE THE DESIRED VOLTAGE SUPPRESSION LEVEL — 404

PROGRAMMABLE DC POWER BUS OVER VOLTAGE PROTECTION

TECHNICAL FIELD

This disclose relates to over voltage protection systems.

BACKGROUND

Aircraft may include direct current (DC) buses to transport power for various components. Controlling such DC power buses for overvoltage events is a common and important challenge in power system design. With the increasing use of high power and voltage topologies in the aviation industry, over voltages may be a source of system failures. For example, a generator or motor of an aircraft may shed load, and the residual magnetic energy may increase a voltage level of the DC bus voltage to greater than a threshold voltage (e.g., a voltage level above-which damage may occur).

SUMMARY

In general, this disclosure describes protection system configured to dynamically adjust a voltage suppression level provided for a DC power bus. Controlling DC power buses for overvoltage events may be a challenge in power system design as over voltages may be a source of system failure or other undesirable events. The protection system may include a series of transient voltage suppressors (TVS) across an electrical bus having a high and low side of an aircraft. The protection circuitry may include a plurality of switches that may be configured to selectively shunt a corresponding TVS of the plurality of TVSs to the low side of the electrical bus. The TVS devices may come in multiple voltage ratings and enable a high degree of programmability for the DC over voltage protection. The protection system may also include a controller that may be configured to determine a desired voltage suppression level and control operation of the plurality of switches such that the plurality of TVSs provides the desired voltage suppression level.

As one example, a system includes a plurality of transient voltage suppressors (TVSs) that are connected in series across an electrical bus of an aircraft, the electrical bus having a high side and a low side; a plurality of switches, each switch of the plurality of switches configured to selectively shunt a corresponding TVS of the plurality of TVSs to the low side of the electrical bus; and a controller configured to: determine a desired voltage suppression level; and control operation of the plurality of switches such that the plurality of TVSs provides the desired voltage suppression level.

As another example, an airframe includes an electrical bus having a high side and a low side; a plurality of TVSs that are connected in series across the electrical bus; a plurality of switches, each switch of the plurality of switches configured to selectively shunt a corresponding TVS of the plurality of TVSs to the low side of the electrical bus; and a controller configured to: determine a desired voltage suppression level; and control operation of the plurality of switches such that the plurality of TVSs provides the desired voltage suppression level.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
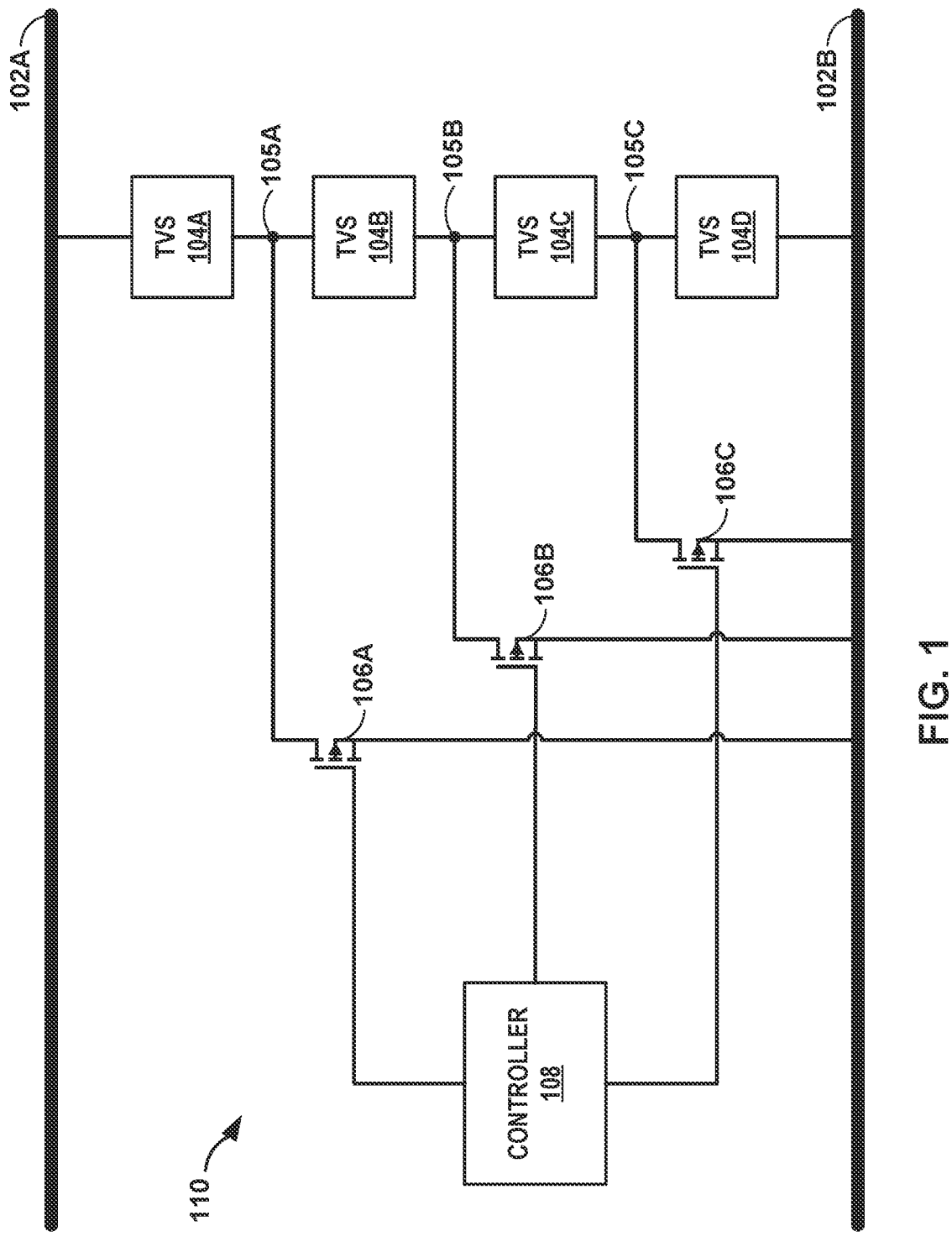
FIG. 1 is a conceptual block diagram illustrating over voltage protection systems including transient voltage suppressors across an electrical bus, a controller, and a plurality of switches, in accordance with one or more techniques of this disclosure.

FIG. 1 is a conceptual block diagram illustrating over voltage protection systems 100 including electrical bus 102, electrical safety system 110 that includes transient voltage suppressors (TVSs) 104A-104D (collectively, "TVSs 104"), switches 106A-106C (collectively, "switches 106"), and a controller 108. In some examples, system 100 may contain additional components relative to those shown in FIG. 1 or may omit some components shown in FIG. 1. As one example, system 100 may include a multiplexer between controller 108 and switches 106.

Electrical bus 102 is a plurality of conductors that are configured to provide electrical power to various components of System 100. As shown in FIG. 1, electrical bus includes high side 102A and low side 102B. In general, high side 102A has a higher potential than low side 102B. Electrical bus 102 provides electrical power interconnection between various components of system 100. Electrical bus 102 may include direct current (DC) bus. As one example, electrical bus 102 may include a DC bus configured to transport electrical power throughout system 100. As one example, electrical bus 102 may transport electrical energy to electric motors that propel a vehicle that includes system 100. Electrical bus 102 may receive electrical energy from one or more sources of a vehicle that includes system 100. For instance, electrical bus 102 may receive electrical energy from as a battery, a generator or alternator.

As discussed above, in some examples, it may be desirable to suppress transient voltages on electrical bus 102. For instance, to avoid or mitigate damage to components connected to electrical bus 102, it may be desirable to suppress transient voltages on electrical bus 102. As such, in some examples, system 100 may include electrical safety system 110, which may be configured to suppresses transient voltages on electrical bus 102.

Electrical safety system 110 may perform one or more functions to provide for safe operation of electrical bus 102. As one example, electrical safety system 110 may suppress transient voltage spikes on electrical bus 102. For instance, electrical safety system 110 may include a transient voltage suppressor (TVS) that prevents or mitigates voltage spikes above a threshold voltage on electrical bus 102. However, in some examples, it may be desirable the threshold voltage level to be adjustable (e.g., during operation).

In accordance with one or more aspects of this disclosure, electrical safety system 110 may the plurality of TVSs 104, switches 106, and controller 108, which may collectively enable suppression of transient voltages on electrical bus 102 with a programmable/adjustable threshold voltage level. Each of TVSs 104 may be a component configured to suppress over-voltage conditions. When a voltage across a particular TVS of TVSs 104 exceeds a threshold voltage of the particular TVS, the particular TVS may allow current to flow through the particular TVS, thereby reducing the voltage across the particular TVS. For instance, TVSs 104 may operate by shunting excess current when the induced voltage exceeds the avalanche breakdown potential. TVSs 104 may be clamping devices. As shown in FIG. 1, TVSs 104 may be connected in series across electrical bus 102. For instance, TVSs 104 may include a series chain of TVSs connected across high side 102A and low side 102B of electrical bus 102. Electrical safety system 110 may include nodes 105A-105C (collectively, "nodes 105") interspersed between TVSs 104.

In some examples, TVSs 104 may all have a same breakdown voltage. For instance, TVS 104A may have a first breakdown voltage $V_{breAk\_104A}$ and TVS 104B may have a second breakdown voltage $V_{break\_104B}$, where $V_{break\_104A}$ is equal to $V_{break\_104B}$). In other examples, some of TVSs 104 may have different breakdown voltages. For instance, TVS 104A may have a first breakdown voltage $V_{break\_104A}$ and TVS 104B may have a second breakdown voltage $V_{break\_104B}$, where $V_{break\_104A}$ is not equal to $V_{break\_104B}$). In some examples, such as where some of TVSs 104 may have different breakdown voltages, the ordering of TVSs 104 may be selected such that TVSs of TVSs 104 with higher breakdown voltage levels are located at a particular position within the series chain. For instance, TVSs 104 may be ordered in descending breakdown voltage order from high side 102A to low side 102B. As one example, where a first TVS of TVSs 104 has a first breakdown voltage level and a second TVS of TVSs 104 has a second breakdown voltage level that is less than the first breakdown voltage level, the first TVS may be electrically located closer to high side 102A than the second TVS (e.g., the first TVS may be TVS 104A and the second TVS may be TVS 104B). While illustrated as including four TVSs, it is understood that TVSs 104 may include any number of TVSs greater than one (i.e., TVSs 104 may include at least two TVSs).

Switches 106 may selectively enable current flow based on one or more control signals. For instance, based on a control signal (e.g., received from controller 108), switch 106A may selectively enable or disable a flow of current through switch 106A. Switches 106 may be electrically positioned to shunt nodes 105 to a low potential, such as low side 102B. As one example, switch 106A may be configured to selectively shunt node 105A to low side 102B. As another example, switch 106B may be configured to selectively shunt node 105B to low side 102B. As another example, switch 106C may be configured to selectively shunt node 105C to low side 102B. Examples of switches 106 include, but are not limited to, semiconductor switches (e.g., transistors), relays, and the like.

In general, controller 108 may control the operation of one or more components of system 100. For instance, controller 108 may control the operation of electrical bus 102, TVSs 104, switches 106, and electrical safety system 110. In some examples, controller 108 may include a single controller that controls all of the components. In other examples, controller 108 may include multiple controllers that each control one or more components. Where controller 108 includes multiple controllers, the controllers may be arranged in any configuration.

Controller 108 may comprise any suitable arrangement of hardware, software, firmware, or any combination thereof, to perform the techniques attributed to controller 108 herein. Examples of controller 108 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 108 includes software or firmware, controller 18 further includes any necessary hardware for storing and executing the software or firmware, such as one or more processors or processing units.

In operation, controller 108 may adjust the effective voltage suppression threshold of electrical safety system 110 by controlling switches 106. For instance, controller 108 may selectively open and close switches 106 to cause the effective voltage suppression threshold provided by electrical safety system 110 (e.g., the voltage threshold at which transients may be suppressed). As one example, to cause the effective voltage suppression threshold to be the breakdown voltage of just TVS 104A (i.e., $V_{break\_104A}$), controller 108 may cause switches 106B and 106C to open and switch 106A to close (e.g., thereby shunting node 105A to low side 102B and bypassing TVSs 104B-104D). As another example, to cause the effective voltage suppression threshold to be the combined breakdown voltages of TVS 104A and TVS 104B (i.e., $V_{break\_104A}+V_{break\_104B}$), controller 108 may cause switches 106A and 106C to open and switch 106B to close (e.g., thereby shunting node 105B to low side 102B and bypassing TVSs 104C and 104D). As another example, to cause the effective voltage suppression threshold to be the combined breakdown voltages of TVS 104A-140C (i.e., $V_{break\_104A}+V_{break\_104B}+V_{break\_104C}$), controller 108 may cause switches 106A and 106B to open and switch 106C to close (e.g., thereby shunting node 105C to low side 102B and bypassing TVS 104D). As another example, to cause the effective voltage suppression threshold to be the combined breakdown voltages of TVS 104A-140D (i.e., $V_{break\_104A}+V_{break\_104B}+V_{break\_104C}+V_{break\_104D}$), controller 108 may cause switches 106A-106C to open. In this way, electrical safety system 110 may provide dynamic and programmable control of the provided voltage suppression threshold.

Figure 2A:
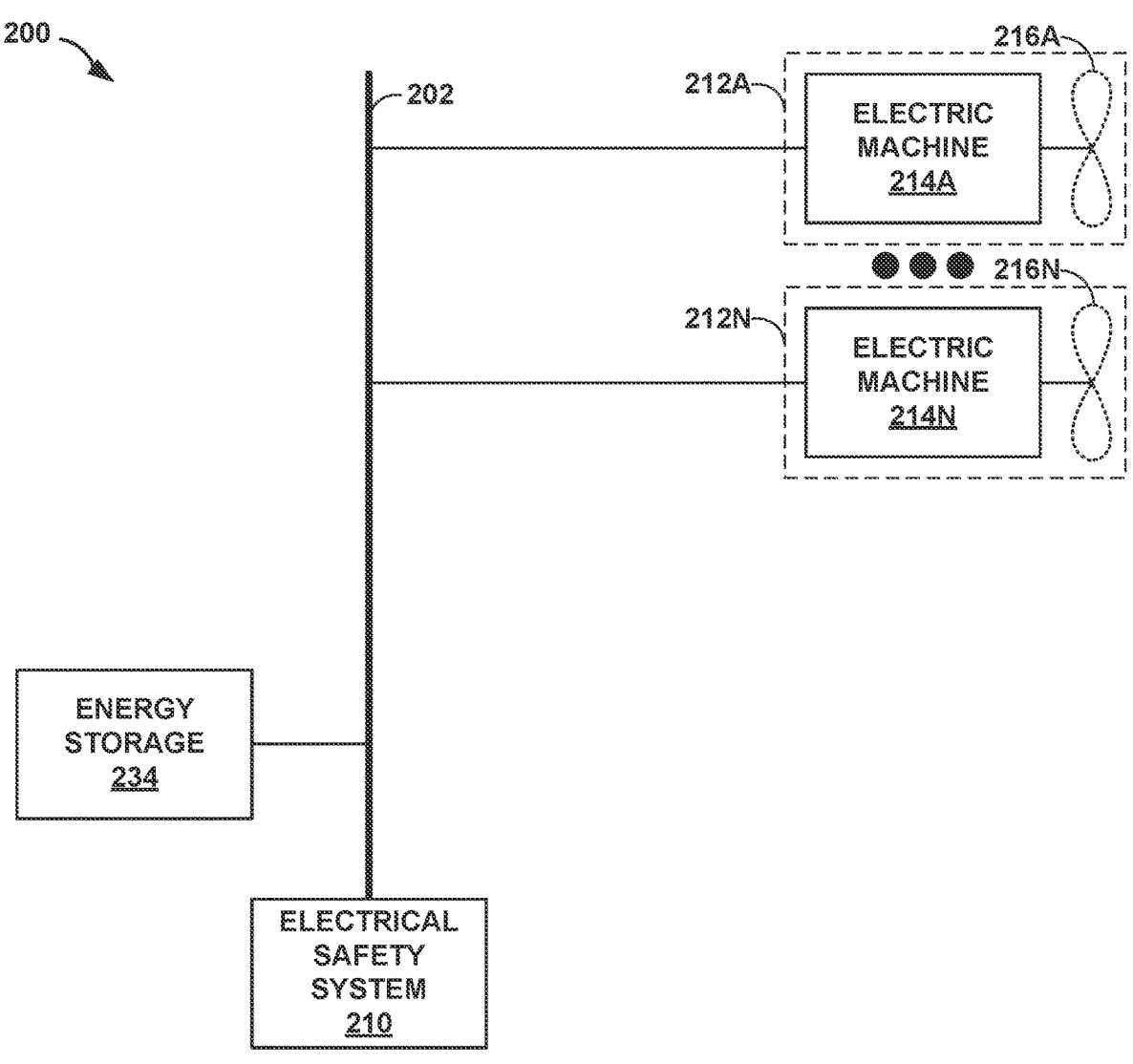
FIG. 2A is a conceptual block diagrams illustrating one example of an over voltage protection system configured to control switches, in accordance with one or more techniques of the disclosure.
Figure 2B:
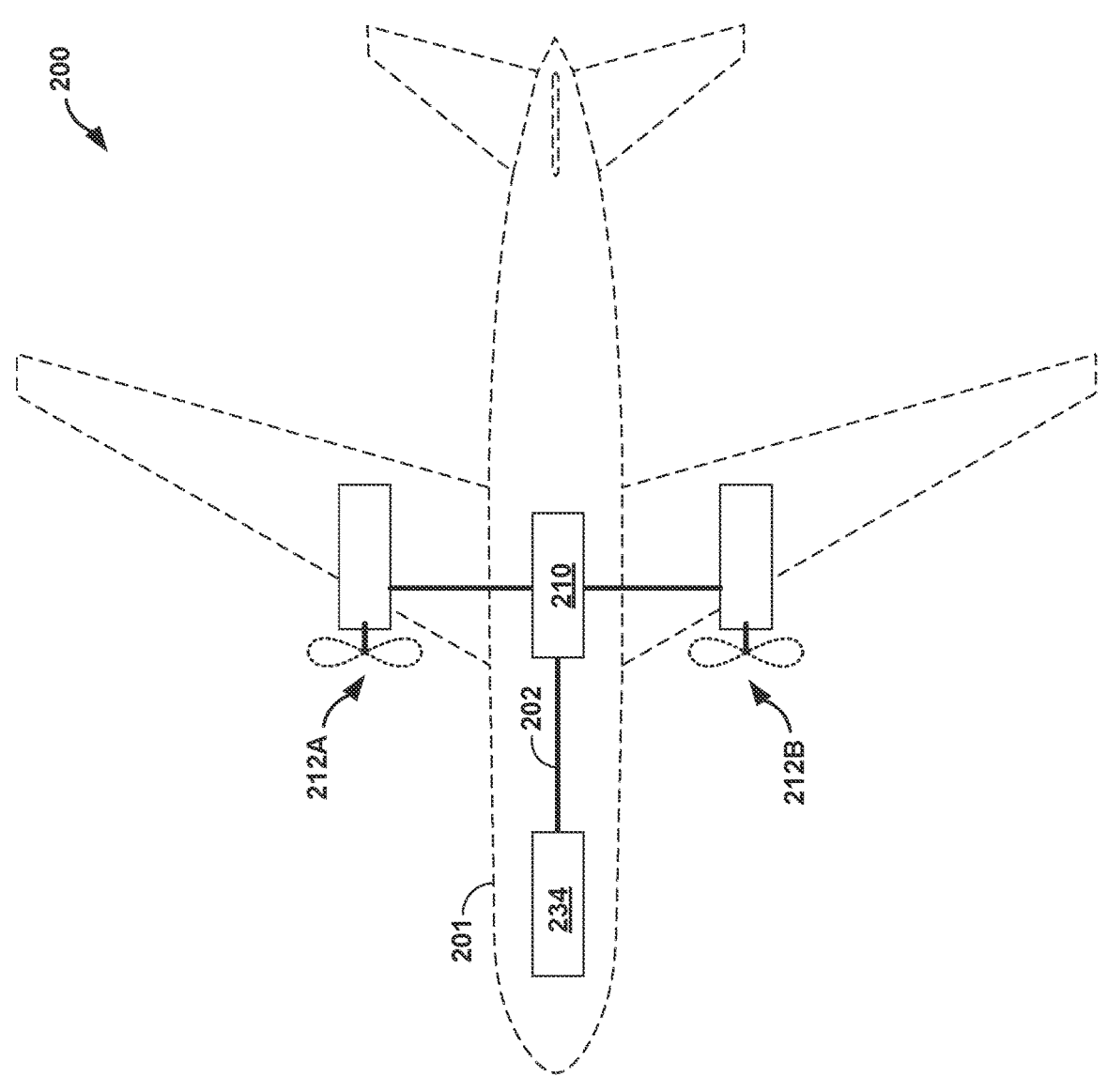
FIG. 2B is a conceptual diagram illustrating an example aircraft, in accordance with one or more aspects of the disclosure.

FIG. 2A is a conceptual block diagram illustrating one example of an overvoltage protection system with adjustable threshold, in accordance with one or more aspects of the disclosure. FIG. 2B is a conceptual diagram illustrating an airframe that includes an overvoltage protection system with adjustable threshold, in accordance with one or more aspects of the disclosure. As shown is FIG. 2A, over voltage protection system 200 may include energy storage system 234, electrical safety system 210, electric machines 214. Electrical bus 202 and electrical safety system 210 may respectively be examples of electrical bus 102 and electrical safety system 110 of FIG. 1.

FIG. 2B is a conceptual diagram illustrating an example aircraft, in accordance with one or more aspects of the disclosure. Aircraft 201 of FIG. 2B may be aircraft that includes system 200, which may provide over voltage protection to aircraft 201. Examples of aircraft 201 include, but are not limited to fixed wing, rotorcraft, vertical takeoff (e.g., VTOL), short takeoff (e.g., STOL), and the like.

Energy storage system (ESS) 234 may be configured to output electrical energy an electrical bus, such as electrical bus 202. Examples of ESS 234 include, but are not limited to, batteries, generators, and the like.

Electrical safety system 210 may perform operations similar to electrical safety system 110 of FIG. 1. For instance, electrical safety system 210 may protect against voltage transients on electrical bus 202 with an adjustable voltage threshold.

System 200 may include one or more electrical propulsion modules 212A-212N (collectively, "electrical propulsion modules 212"). Electrical propulsion modules 212 may each include an electric machine of electric machines 214A-214N (collectively, "electric machines 214") and a propulsor of propulsors 216A-216N (collectively, "propulsors 216"). In some examples, such as where electrical bus 202 is a DC bus, electrical propulsion modules 212 may include inverters configured to drive electric machines 214. In operation, electric machines 214 may operate (e.g., provide rotational mechanical energy to) propulsors 216 using electrical energy sourced from electrical bus 202.

Figure 3:
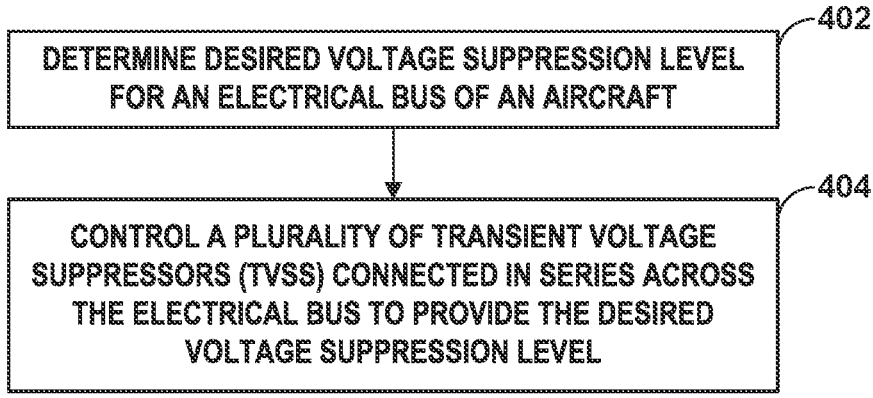
FIG. 3 is a flowchart illustrating example processes for controlling protection systems, in accordance with one or more techniques of this disclosure.

FIG. 3 is a flowchart illustrating example processes for controlling protection systems, in accordance with one or more techniques of this disclosure. The techniques of FIG. 3 are discussed with reference to system 100 of FIG. 1, however other systems may perform the techniques of FIG. 3.

Controller 108 of system 100 may determine desired voltage suppression level for an electrical bus of an aircraft (402). For instance, controller 108 may determine, based on an altitude of aircraft 201, the desired voltage suppression level. In some examples, the desired voltage suppression level may be negatively correlated with the altitude. For instance, as the altitude increases, the desired voltage suppression level may decrease (e.g., due to effects of Paschen's law).

Controller 108 may control a plurality of transient voltage suppressors (TVSS) 104 connected in series across the electrical bus 102 to provide the desired voltage suppression level (404). For instance, controller 108 may determine length of the chain of TVSs 104 that provide the desired voltage suppression level. As one example, where the desired voltage suppression level is 1500 volts and the breakdown voltages of TVSs 104A-104C are each 500 volts, controller 108 may cause switch 106C to close and switches 106A and 106B to open, thereby controlling operation of switches 106 such that TVSs 104 provide the desired voltage suppression level. As another example, where the desired voltage suppression level is 1500 volts and the breakdown voltages of TVS 104A is 1000 volts, TVS 104B is 500 volts, and TVS 104C is 250 volts, controller 108 may cause switch 106B to close and switches 106A and 106C to open, thereby controlling operation of switches 106 such that TVSs 104 provide the desired voltage suppression level.

Aspects of this disclosure may also be described in the following examples.

Example 1. A system comprising: a plurality of transient voltage suppressors (TVSs) that are connected in series across an electrical bus of an aircraft, the electrical bus having a high side and a low side; a plurality of switches, each switch of the plurality of switches configured to selectively shunt a corresponding TVS of the plurality of TVSs to the low side of the electrical bus; and a controller configured to: determine a desired voltage suppression level; and control operation of the plurality of switches such that the plurality of TVSs provides the desired voltage suppression level.

Example 2. The system of example 1, wherein each TVS of the plurality of TVSs has a same breakdown voltage level.

Example 3. The system of example 1, wherein a first TVS of the plurality of TVSs provides a first breakdown voltage level, and wherein a second TVS of the plurality of TVSs provides a second breakdown voltage level that is less than the first breakdown voltage level.

Example 4. The system of example 3, wherein the first TVS is electrically located, in the plurality of TVSs, closer to the high side than the second TVS.

Example 5. The system of any of examples 1-4, wherein, to determine the desired voltage suppression level, the controller is configured to determine the desired voltage suppression level based on an altitude of the aircraft.

Example 6. The system of example 5, wherein, to determine the desired voltage suppression level based on the altitude of the aircraft, the controller is configured to adjust the desired voltage suppression level with a negative correlation to the altitude of the aircraft.

Example 7. The system of any of examples 1-6, wherein the electrical bus comprises a direct current (DC) electrical bus.

Example 8. An airframe comprising: an electrical bus having a high side and a low side; a plurality of transient voltage suppressors (TVSs) that are connected in series across the electrical bus; a plurality of switches, each switch of the plurality of switches configured to selectively shunt a corresponding TVS of the plurality of TVSs to the low side of the electrical bus; and a controller configured to: determine a desired voltage suppression level; and control operation of the plurality of switches such that the plurality of TVSs provides the desired voltage suppression level.

Example 9. The airframe of example 8, further comprising: a propulsor configured to propel the airframe; and an electric motor configured to operate the propulsor using electrical energy received from the electrical bus.

Example 10. The airframe of example 8 or 9, wherein each TVS of the plurality of TVSs has a same breakdown voltage level.

Example 11. The airframe of example 8 or 9, wherein a first TVS of the plurality of TVSs provides a first breakdown voltage level, and wherein a second TVS of the plurality of TVSs provides a second breakdown voltage level that is less than the first breakdown voltage level.

Example 12. The airframe of example 11, wherein the first TVS is electrically located, in the plurality of TVSs, closer to the high side than the second TVS.

Example 13. The airframe of any of examples 8-12, wherein, to determine the desired voltage suppression level, the controller is configured to determine the desired voltage suppression level based on an altitude of the airframe.

Example 14. The airframe of example 13, wherein, to determine the desired voltage suppression level based on the airframe of the aircraft, the controller is configured to adjust the desired voltage suppression level with a negative correlation to the altitude of the airframe.

Example 15. The airframe of any of examples 8-14, wherein the electrical bus comprises a direct current (DC) electrical bus.

Various examples of the disclosure have been described. These and other examples are within the scope of the following claims.

What is claimed is:

1. A system comprising:
 a plurality of transient voltage suppressors (TVSs) that are connected in series across an electrical bus of an aircraft, the electrical bus having a high side and a low side;
 a plurality of switches, each switch of the plurality of switches configured to selectively shunt a corresponding TVS of the plurality of TVSs to the low side of the electrical bus; and a controller configured to:

determine, based on an altitude of the aircraft, a desired voltage suppression level for the electrical bus with a negative correlation to the altitude of the aircraft; and control, during flight of the aircraft, operation of the plurality of switches such that the plurality of TVSs provides the desired voltage suppression level.

2. The system of claim 1, wherein each TVS of the plurality of TVSs has a same breakdown voltage level.

3. The system of claim 1, wherein a first TVS of the plurality of TVSs provides a first breakdown voltage level, and wherein a second TVS of the plurality of TVSs provides a second breakdown voltage level that is less than the first breakdown voltage level.

4. The system of claim 3, wherein the first TVS is electrically located, in the plurality of TVSs, closer to the high side than the second TVS.

5. The system of claim 1, wherein the electrical bus comprises a direct current (DC) electrical bus.

6. An airframe comprising:

an electrical bus having a high side and a low side;

a plurality of transient voltage suppressors (TVSs) that are connected in series across the electrical bus;

a plurality of switches, each switch of the plurality of switches configured to selectively shunt a corresponding TVS of the plurality of TVSs to the low side of the electrical bus; and a controller configured to:

determine, during flight of the airframe and based on an altitude of the aircraft, a desired voltage suppression level with a negative correlation to the altitude of the aircraft; and control, during the flight of the airframe, operation of the plurality of switches such that the plurality of TVSs provides the desired voltage suppression level.

7. The airframe of claim 6, further comprising:

a propulsor configured to propel the airframe; and an electric motor configured to operate the propulsor using electrical energy received from the electrical bus.

8. The airframe of claim 6, wherein each TVS of the plurality of TVSs has a same breakdown voltage level.

9. The airframe of claim 6, wherein a first TVS of the plurality of TVSs provides a first breakdown voltage level, and wherein a second TVS of the plurality of TVSs provides a second breakdown voltage level that is less than the first breakdown voltage level.

10. The airframe of claim 9, wherein the first TVS is electrically located, in the plurality of TVSs, closer to the high side than the second TVS.

11. The airframe of claim 6, wherein the electrical bus comprises a direct current (DC) electrical bus.

12. A method comprising:

determining, during flight of an aircraft and by a controller of the aircraft, a desired voltage suppression level for an electrical bus of the aircraft with a negative correlation to an altitude of the aircraft, wherein the aircraft includes:

a plurality of transient voltage suppressors (TVSs) that are connected in series across the electrical bus, the electrical bus having a high side and a low side; and a plurality of switches, each switch of the plurality of switches configured to selectively shunt a corresponding TVS of the plurality of TVSs to the low side of the electrical bus; and controlling, by the controller and based on the desired voltage suppression level, operation of the plurality of switches such that the plurality of TVSs provides the desired voltage suppression level.

\* \* \* \* \*